United States Patent
Ferrone

(10) Patent No.: US 10,507,760 B2
(45) Date of Patent: Dec. 17, 2019

(54) ENHANCED VEHICLE AUTHENTICATION SYSTEM PLATFORM PROVIDING REAL TIME VISUAL BASED UNIQUE TAXI VEHICLE AUTHENTICATION FOR CUSTOMERS AND DRIVERS AND METHODS OF IMPLEMENTING THE SAME

(71) Applicant: Rock A. Ferrone, Tarentum, PA (US)

(72) Inventor: Rock A. Ferrone, Tarentum, PA (US)

( * ) Notice: Subject to any disclaimer, the term of this patent is extended or adjusted under 35 U.S.C. 154(b) by 0 days.

(21) Appl. No.: 15/900,155

(22) Filed: Feb. 20, 2018

(65) Prior Publication Data

US 2019/0232860 A1 Aug. 1, 2019

Related U.S. Application Data

(60) Provisional application No. 62/623,283, filed on Jan. 29, 2018.

(51) Int. Cl.
| | |
|---|---|
| *G06F 3/048* | (2013.01) |
| *B60Q 1/26* | (2006.01) |
| *G07B 13/04* | (2006.01) |
| *B60Q 1/50* | (2006.01) |

(52) U.S. Cl.
CPC .......... *B60Q 1/2611* (2013.01); *B60Q 1/2615* (2013.01); *B60Q 1/503* (2013.01); *G07B 13/045* (2013.01)

(58) Field of Classification Search
CPC .... B60Q 1/2611; B60Q 1/2615; B60Q 1/503; G07B 13/045
See application file for complete search history.

(56) References Cited

U.S. PATENT DOCUMENTS

| | | | |
|---|---|---|---|
| 6,056,425 A * | 5/2000 | Appelberg | B60Q 1/2611 362/493 |
| 6,347,468 B1 | 2/2002 | Mohamed | |
| 6,756,913 B1 | 6/2004 | Ayed | |
| 9,037,852 B2 | 5/2015 | Pinkus et al. | |
| 9,157,748 B2 | 10/2015 | Millspaugh | |
| 9,488,494 B2 | 11/2016 | Millspaugh | |
| 9,494,938 B1 * | 11/2016 | Kemler | G05D 1/0088 |
| 9,516,460 B2 * | 12/2016 | Ambrefe, Jr. | G06F 3/0488 |
| 9,723,447 B2 | 8/2017 | Lubeck et al. | |
| 9,826,362 B2 | 11/2017 | Lubeck et al. | |
| 9,892,637 B2 | 2/2018 | Demisse | |

(Continued)

*Primary Examiner* — Munear T Akki
(74) *Attorney, Agent, or Firm* — Blynn L. Shideler; Krisanne Shideler; BLK Law Group

(57) ABSTRACT

An apparatus and method for real time visual based taxi vehicle authentication for customers and drivers for smartphone application based taxi services. The method includes providing a visible display on a taxi vehicle in a conspicuously visible location. The display is configured for real time selective displaying changeable unique visual identification signals. The method includes selecting a specific visual identification signal by the smartphone application for a given customer, driver and vehicle for a specific use and sending this visual identification signal to the customer and to the driver via the smartphone application, wherein the visual identification signal is selectively viewable by the customer and displayed on the customer's smartphone; and displaying the visual identification signal on the display at least at a time when the vehicle is in proximity to the customer.

16 Claims, 2 Drawing Sheets

(56) References Cited

U.S. PATENT DOCUMENTS

Figure 1:
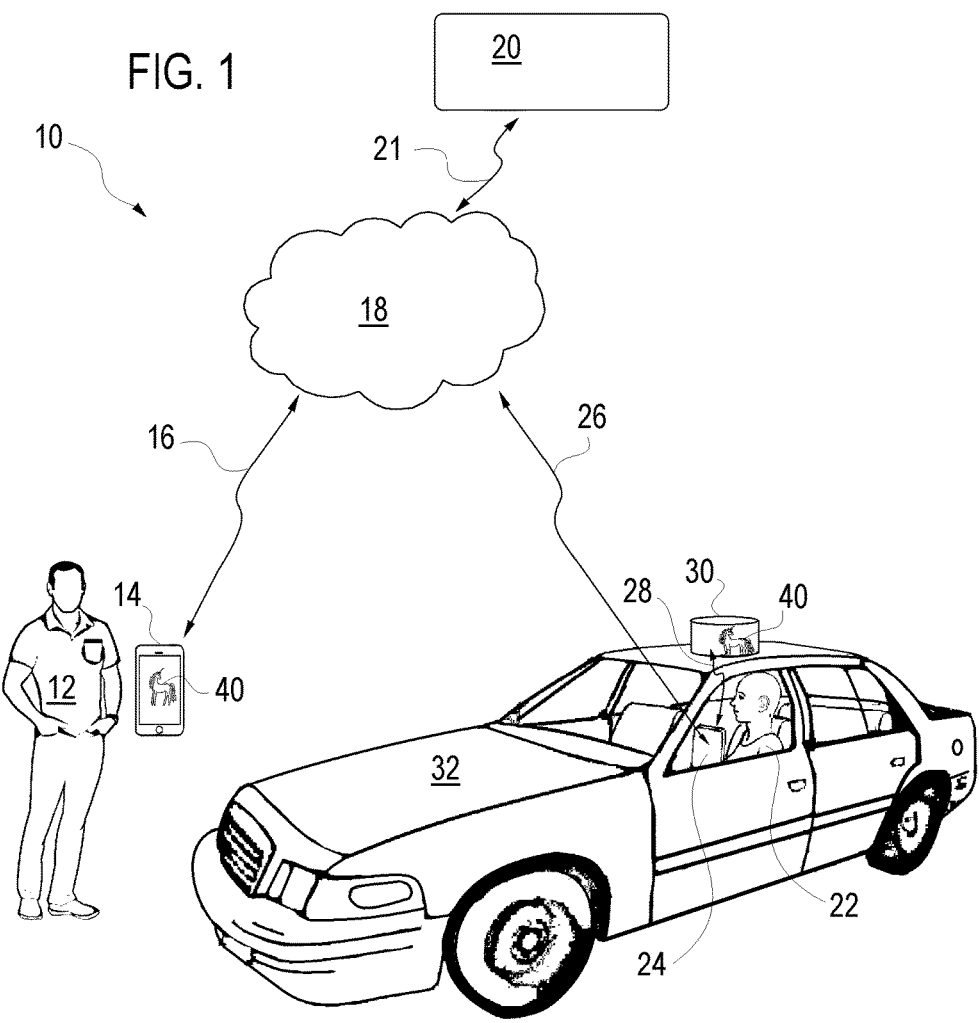
Figure 2A:
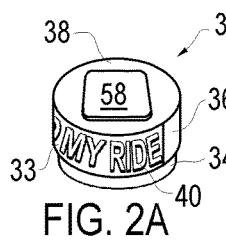
Figure 2B:
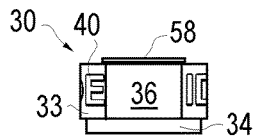
Figure 2C:
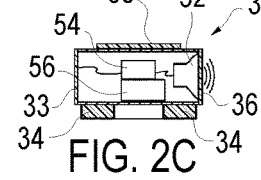
Figure 2D:
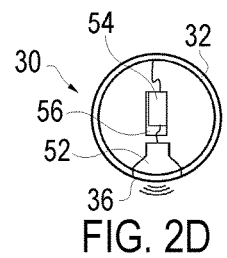

| | | | |
|---|---|---|---|
| 2002/0112026 A1* | 8/2002 | Fridman | A61K 38/2221 |
| | | | 709/217 |
| 2009/0256697 A1* | 10/2009 | Tallinger | B60Q 1/2611 |
| | | | 340/472 |
| 2010/0194556 A1* | 8/2010 | LaRosa | B60Q 1/2611 |
| | | | 340/471 |
| 2011/0102165 A1 | 5/2011 | Rahamim | |
| 2012/0137257 A1* | 5/2012 | Lalancette | G06Q 30/00 |
| | | | 715/846 |
| 2012/0201041 A1* | 8/2012 | Gergets | B60Q 1/2611 |
| | | | 362/493 |
| 2013/0196638 A1 | 8/2013 | Kim et al. | |
| 2014/0070946 A1* | 3/2014 | Ambrefe, Jr. | G06F 3/0488 |
| | | | 340/541 |
| 2014/0335897 A1 | 11/2014 | Clem et al. | |
| 2015/0348408 A1* | 12/2015 | Demisse | G08G 1/017 |
| | | | 340/933 |
| 2017/0115125 A1 | 4/2017 | Outwater et al. | |
| 2018/0211348 A1* | 7/2018 | Narayan | G06Q 50/30 |

* cited by examiner

ENHANCED VEHICLE AUTHENTICATION SYSTEM PLATFORM PROVIDING REAL TIME VISUAL BASED UNIQUE TAXI VEHICLE AUTHENTICATION FOR CUSTOMERS AND DRIVERS AND METHODS OF IMPLEMENTING THE SAME

RELATED APPLICATIONS

The present application claims the benefit of U.S. Provisional Patent Application 62/623,283 filed Jan. 29, 2018 entitled "Method and Apparatus for Real Time Visual Based Taxi Vehicle Authentication for Users and Drivers" which is incorporated herein by reference.

BACKGROUND INFORMATION

1. Field of the Invention

The present invention relates to enhanced vehicle authentication systems for taxi vehicle authentication, and more particularly to method and apparatus for real time visual based taxi vehicle authentication for customers and drivers and methods of implementing the same.

2. Background Information

Smartphone application-based taxi services, sometimes called on-demand transportation services, utilizing non-standardized vehicles (i.e., the taxi service drivers will often use their own vehicles) are increasingly popular with UBER, LYFT, FASTEN, HAXI, VIA, DIDI CHUXING, OLA CABS, GRAB, SIDECAR and GO-JEK generally being representative examples (although not all these services compete in every jurisdiction). UBER is the largest and most well-known within the United States, although DIDI CHUXING has a larger number of customers overall.

The "customers" of smartphone application based services are sometimes references as users, however in the smartphone application-based taxi services both the taxi passenger and the taxi driver can properly be considered as users of the app. The present application attempts to distinguish these application users by referencing them as customers and drivers herein. Additionally there is a class of customer application users of smartphone application-based taxi services that are not actual taxi passengers, namely those that use the app to order taxi services for others such as for caregiver transportation of third parties under their care. In this limited case those ordering taxis for others on the app are referenced as custodial customer or caregiver customer, and the actual taxi passenger will be referenced as a passenger customer, with the caregiver customer, the passenger customer and the taxi driver all being "users" of the app.

The phrase "taxi service" is sometimes hotly contested in certain jurisdictions particularly those with common carrier licensing requirements, resulting in many arguing that the above listed on-demand transportation services are not "taxi services" within a given jurisdiction's legal definition. The present application is intended to utilize the phrase "taxi services" in the broadest sense without the need to characterize or distinguish the above identified on-demand transportation with what has been identified as traditional taxi services. As will be apparent in the following description, the present invention is designed for smartphone application-based taxi services utilizing non-standardized vehicles, but it is also applicable to traditional taxi services, and others such as limousine driver services and water taxis (as representative examples).

One issue with customers of smartphone application-based taxi services utilizing non-standardized vehicles is customers cannot easily and quickly identify the vehicle that is picking them up. Customers are often sent identifying information such as the make and model of the vehicle, but this is often insufficient for easy and rapid vehicle identification. Southwest Airlines (Southwest) spoofed this problem in their "Wanna Get Away?" ad campaign spot called "Bank Heist", where a customer of a smartphone application-based taxi service mistakenly gets into the back seat of what he thinks is his ordered taxi, but what is in reality a get-away car involved in a bank heist. Two bank robbers, complete with masks and a duffel bag of recently purloined bank cash, jump in on either side of the customer and are surprised to find him there. With the car peeling away from the scene, one bank robber points at the befuddled customer and yells to the driver "I thought we said no hostages." Die packs in the duffel bag explode covering the bewildered customer, accentuated by Southwest's trademark line "Wanna get away?" The consequences of failing to properly identify an ordered vehicle are seldom as dire as portrayed in this ad, but this ad works on some level because of the existence of this problematic issue for customers.

Within the meaning of this invention, Vehicle Authentication Systems are the methods currently utilized by most smartphone application-based taxi services, such as transmitting the make and model of the vehicle to the customer. The known Vehicle Authentication Systems can include very specific car and driver identifying information that they have on hand, such as the license plate number, driver license ID number of the driver, taxi medallion number of the driver, or even VIN number of the vehicle; but these are not particularly helpful for easy and rapid vehicle identification of particular vehicle in ordinary use. Attempts have been made to improve this part of the customer's experience and provide what will be called herein as "Enhanced Vehicle Authentication Systems" (EVAS) for easy and rapid vehicle identification by customers.

In 2011 Waterford, Ireland taxi drivers signed up to be part of a pilot (EVAS) scheme aimed at giving any member of the public the ability to confirm the identity of a taxi driver in real-time using their smartphone. Each taxi driver placed a QR code just above the door handle on both rear door windows making it accessible for the customer to scan the code from the footpath. QR codes were also placed inside the vehicle on the back of the front seat and on the dashboard of the vehicle. Each QR code was unique for the public service vehicle and was scanned by the customer on his smartphone to verify the vehicle and the driver. This EVAS supports the need for a real time taxi vehicle authentication for customers, but this system does little to truly facilitate initial identification since the customer must first find the vehicle before it can be scanned and verified.

In 2016, LYFT introduced an EVAS known as the LYFT Beacon. This allowed the driver to have a light-up beacon, which LYFT calls "amps," on the dashboard of Lyft drivers' cars beginning Jan. 1, 2017 in New York, Las Vegas, San Francisco and Los Angeles. In this EVAS, the driver's beacon lights as a specific color once the vehicle comes near the customer. The app allows the customer's smartphone to light up in that same color, which the customer may hold up so the driver can identify the customer.

In the last quarter of 2017, UBER introduced their own "beacon" based EVAS that mounted to the windshield, and further added the functionality where the customer selects the color.

The internal beacon approach of the Lyft and Uber brand EVAS has at least four serious drawbacks: (1) In large event venues such as concerts, sporting events, airports, parades, New Year's Eve celebrations, etc., the color selections are limited. If there are multiple taxis in the same proximity, the odds that two customers or drivers select the same or similar color is high, which would exacerbate the problem rather than solve it. Either a customer seeing their chosen color would be directed toward the wrong vehicle before realizing it belongs to another customer, or a driver could pull up to the wrong customer who is holding the same or similar color. (2) The internal mounting of the beacon in each of these EVAS can hinder or limit the field of view of the driver. And, the smaller the beacon to avoid hindering the driver's view, the less noticeable it is to the customer. (3) When used at night, such internal beacons can cause glare off of the windshield and also light the interior of a vehicle making it much harder for the driver to see out of the vehicle. In addition, the placement of the light in the passenger side of the front windshield exacerbates this issue by impairing the driver's line of vision toward the potential customer. (4) A fourth drawback is regulation compliance with these EVAS platforms. Some jurisdictions do not allow mounting extraneous materials on the dash or on the windshield of a vehicle due to the vision obstruction concerns. In addition, some jurisdictions do not allow forward-facing lights on a vehicle other than approved headlights, fog lights and the like due to potential conflict with emergency vehicles. An EVAS platform that fails to comply with regulatory restrictions raises issues for smartphone application-based taxi services that have a history of battles with traditional taxi services.

There remains a need in the art for an effective and efficient EVAS platform for real time visual based taxi vehicle authentication for customers and drivers for smartphone application based taxi services, particularly those utilizing non-standardized vehicles

SUMMARY OF THE INVENTION

This invention is directed to an effective and efficient EVAS platform for real time visual based unique taxi vehicle authentication for customers and drivers for smartphone application based taxi services, particularly those utilizing non-standardized vehicles.

One aspect of the invention provides a method for real time visual based taxi vehicle authentication for customers and drivers for smartphone application based taxi services comprising the steps of: Providing a visible display on a taxi vehicle in a conspicuously visible location that is coupled to the taxi vehicle driver's smartphone, wherein the visible display is configured for real time selective displaying changeable unique visual identification signals which comprise at least one of i) a range of selectable alphanumeric information, ii) a range of selectable pictographic images, iii) visual effects/animations, iv) audio components and v) combinations thereof; Selecting a specific visual identification signal by the smartphone application for a given customer, driver and vehicle for a specific use and sending this visual identification signal to the customer and to the driver via the smartphone application, wherein the visual identification signal is selectively viewable by the customer and displayed on the customer's smartphone; Displaying the visual identification signal on the display at least at a time when the vehicle is in proximity to the customer.

The method for real time visual based taxi vehicle authentication for customers and drivers according to invention may further include the step of the customer showing the visual identification signal on the customer's smartphone to the driver. Alternatively, the step of displaying the visual identification signal on the display is only at a time when the vehicle is in close proximity to the customer. Further, the method for real time visual based taxi vehicle authentication for customers and drivers according to invention may provide wherein the unique visual identification signals comprising at least a range of colors.

The method for real time visual based taxi vehicle authentication for customers and drivers according to one specific embodiment of the invention provides wherein the display is a portable, compact display formed as a disc shaped structure 3"-8" in diameter and 1½" to 6" in height having a programmable LED message display panel around a circumferential portion of the perimeter of the disc, and wherein the unique visual identification signals comprise at least scrolling text.

The method for real time visual based taxi vehicle authentication for customers and drivers according to invention may include wherein the unique visual identification signals comprise audio components. The method for real time visual based taxi vehicle authentication for customers and drivers according to invention may provide wherein the front of the display has a 60-120 degree portion without the display panel.

The method for real time visual based taxi vehicle authentication for customers and drivers according to invention may provide wherein the display includes a temporary mount in the form of at least one magnet, and wherein the display includes a solar panel to assist in powering the display.

The method for real time visual based taxi vehicle authentication for customers and drivers according to invention provides for specific application such as further configured for caregiver transportation of third parties, including the steps of ordering the taxi by a custodial customer and communicating via the smartphone application with a passenger customer, wherein the visual identification signal is selectively viewable by the passenger customer and displayed on the passenger customer's smartphone. Alternatively, the method for real time visual based taxi vehicle authentication for customers and drivers according to invention may provide wherein the method includes restricted area access accommodation wherein the customers communicates with a security checkpoint and allows the security checkpoint smartphones to actuate the signal on the display of the vehicle in proximity to the checkpoint.

The method for real time visual based taxi vehicle authentication for customers and drivers according to invention may provide wherein within a close proximity between the customer and the vehicle a scrolling text forming part of the identification signal displays in the unique color, and between a visual distance and the close proximity the display is illuminated in the unique color of the signal.

One aspect of the invention provides an apparatus for real time visual based taxi vehicle authentication for customers and drivers for smartphone application based taxi services comprising a visible display configured to be placed on a taxi vehicle in a conspicuously visible location, wherein the display is coupled to the taxi vehicle driver's smartphone, and wherein the visible display is configured for real time selective displaying changeable unique visual identification signals comprising at least one of i) a range of selectable alphanumeric information, ii) a range of selectable pictographic images, iii) audio components, iv) visual effects/animations and v) combinations thereof, and wherein the apparatus is configured for selecting of a specific visual identification signal by the smartphone application for a given customer, driver and vehicle for a specific use and sending this visual identification signal to the customer and to the driver via the smartphone application, wherein the visual identification signal is selectively viewable by the customer and displayed on the customer's smartphone, and wherein the apparatus is configured for displaying the visual identification signal on the display at least at a time when the vehicle is in proximity to the customer.

These and other aspects of the present invention will be clarified in the description of the preferred embodiment of the present invention described below.

BRIEF DESCRIPTION OF THE PREFERRED EMBODIMENTS

Figure 3:
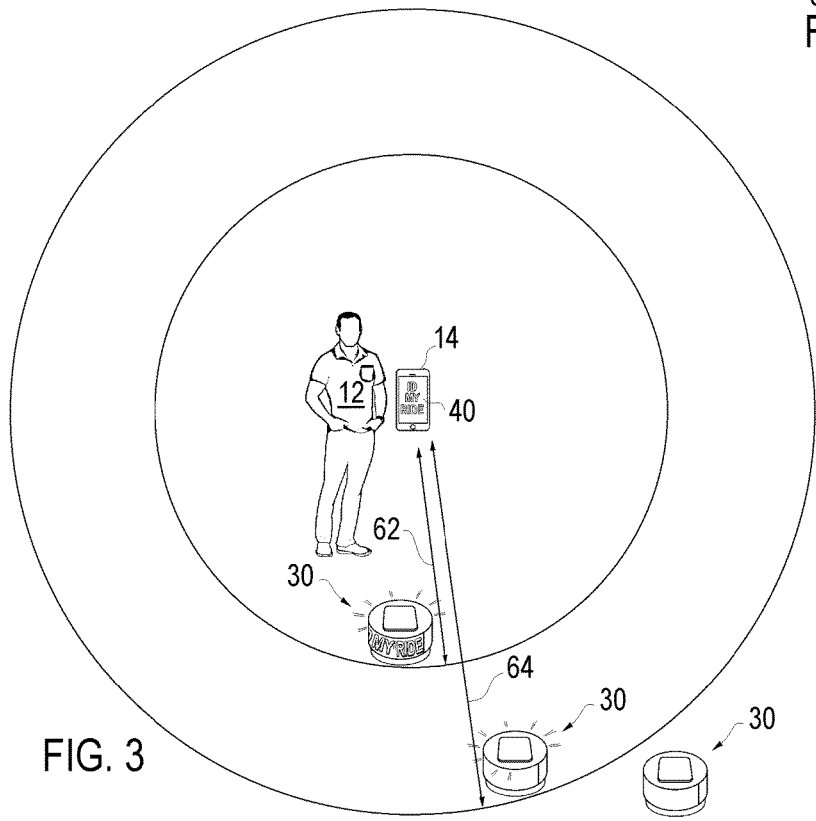

FIG. 1 is a schematic representation of EVAS platform providing real time visual based unique taxi vehicle authentication for customers and drivers for smartphone application based taxi services, particularly those utilizing non-standardized vehicles according to one aspect of the present invention;

FIGS. 2A-D are schematic perspective, front, side sectional and top sectional views of an EVAS display for use in the EVAS platform according to the present invention; and FIG. 3 is a schematic illustration showing proximity ranges for staged output of an EVAS display for use in the EVAS platform according to the present invention.

BRIEF DESCRIPTION OF THE PREFERRED EMBODIMENTS

This invention relates to an apparatus or EVAS platform 10 and method for real time visual based taxi vehicle 32 unique authentication for customers 12 and drivers 22 for smartphone application based taxi services.

The present invention builds upon well-known existing smartphone based on demand transportation systems in which the customers 12 have an app on their phone 14 typically downloaded from the cloud 18 via connection 16 and which is controlled by the software management system 20 coupled via connection 21. Similarly, the individual drivers 22 of the taxi vehicles 32 have their version of the app downloaded on their smartphone devices 24 via connection 26. These aspects of the apparatus 10 are conventional and need not be discussed in detail herein.

A smartphone (such as customer's smartphone 14 and driver's smartphone 24) is a handheld personal computer with a mobile operating system and an integrated mobile broadband cellular network connection for voice, SMS, and Internet data communication; most if not all smartphones also support Wi-Fi. Smartphones 14, 24 are sometimes distinguished from tablets, sometimes only by size, but for this application the term smartphone will encompass tablets. A smartphone application, or app, is merely a computer program designed to run on the smartphone.

The method according to the present invention comprises the step of providing a visible display 30 on a taxi vehicle 32 in a conspicuously visible location that is coupled 28 to the smartphone 24 of the taxi vehicle driver 22. The visible display is configured for real time selective displaying changeable unique visual identification signals 40 comprising at least one of i) a range of selectable alphanumeric information, ii) a range of selectable pictographic images (such as an emojis or even emoticons), iii) visual effects/animations, audio components, and iv) combinations thereof. The "unique visual identification signal" 40 is, in this context possible to be formed of only audio components, for a given customer 12. However, the display 30 of the invention includes visual capabilities, even if a particular signal 40 for a customer 12 (such as a visually impaired customer 12) is exclusively audio for that customer 12.

The unique visual identification signals 40 on the display 30 of the present invention is more than merely an interior mounted colored beacon as discussed above with prior art EVAS platforms. Having the display 30 show the signal 40 with given visual effect or animation, such as "BOB SMITH'S TAXI" in red scrolling text in the display 30 of FIGS. 2A-D or in letters that zip in from the right of the roof mounted display screen of FIG. 1 every 3 seconds creates a unique display identification signal 40 for the display 30 that is easily recognizable to the customer 12.

Emoji's are small digital images or icons that are well known and vary widely. An Emoji, and an animated emoji, represents a wide assortment of possible unique display identification signals 40, and the emoji use for the platform 10 may add certain style and whimsy to the system 10 facilitating customer 12 acceptance. Consider a wrapped present in a gold box with red ribbon style emoji forming signal 40 which is likely easily spotted (depending upon the conspicuous location and size of the display 30), and animating this emoji signal 40 to tie or untie the bow makes the potential signal 40 more unique and easily identifiable at a distance. The use of emoji's require, of course, a display 30 capable of rendering the same in a recognizable fashion.

The visual display 30 can be formed of any number of programmable display devices, including a display formed of programmable Light Emitting Diode (LED) colored lights as shown in FIGS. 2A-D and 3. Another alternative for forming the display 30 include the visual display of a tablet computer. Another alternative is an Organic Light Emitting Diode (OLED). Additionally, in 2013 both Samsung and LG introduced started producing flexible Active Matrix Organic Light Emitting Diode (AMOLED) displays on plastic (polyimide) substrates. Both companies are now mass producing such AMOLED displays, which are commonly being used in mobile phones and wearable devices, and such AMOLED displays would also serve as an effective display 30 of the invention. Any digital display 30 that can be coupled and controlled from the driver's smartphone 24, can display the desired signals 40, and is suitable for the desired mounting location and operating environments is acceptable to form the display 30 of the present invention.

The display 30 could theoretically be a tablet that the driver 22 places on the dashboard or couples to the passenger side front window of the vehicle 22. In this embodiment where the tablet forms the display 30 for the apparatus 10 of the present invention it is possible that the display 30 and the driver's smartphone 24 are integrated together, namely the tablet 30/24 serves as both the display 30 of the present invention and the driver's smartphone 24. However, although the display 30 mounted within the vehicle is possible, it is not preferred because this can limit the size of the display 30 and otherwise limit the view of the driver 22, can be distracting to the driver at night and impede finding the customers and impede operation of the vehicle, and such an implementation may not comply with all local vehicle regulation. It is preferred that the display 30 be mounted on the exterior of the vehicle 32 without effecting the operation of the vehicle 32 by the driver 22. Specifically a simple easy roof mounted display as shown in FIG. 2A-D is preferred.

The conspicuously visible location on the taxi vehicle 32 can vary, as can the mounting technique. In the taxi art it is well known to couple electronic displays (the TAXI signage often on the top of vehicles) on the exterior of the vehicle 32 via suction cups, magnets and other coupling techniques. These can be used to attach a suitable display 30 of the present invention. Although mounting of the display 30 on the dashboard, or to the side window is also possible, it is not preferred as noted above for the practical and regulatory limitations. The specific mounting of the display 30 may be wide and varied, however it is preferred if the mounting is temporary as the present EVAS platform 10 is designed with part time drivers 22 in mind and the part time driver 22 may not want to have the display 30 permanently attached to their vehicles 32.

The visible display 30 is configured for real time selective displaying changeable unique visual identification signals 40. The method according to the present invention comprises the step of selecting a specific visual identification signal 40 by the smartphone application 20 for a given customer 12, driver 22 and vehicle 32 for a specific use and sending this visual identification signal 40 to the customer 12 and to the driver 22 via the smartphone application and coupling 16 and 26, wherein the visual identification signal is selectively viewable by the customer 12 and displayed on the customer's smartphone 14. The signal 40 will be displayed on the display 30 at least when the vehicle 32 is in close proximity to the customer 12, as discussed below in connection with FIG. 3. Further, the signal 40 may be viewed on the smartphone 24 of the driver 22 to aid him in authenticating the customer 12, particularly where the display 30 is not easily visible to the driver 22, such as roof mounted applications.

For example, the customer 12 (or driver 22 or manager 20) may select a flashing magenta walking two hump camel emoji as the unique visual identification signal 40 for a given customer 12, driver 22 and vehicle 32 for a given usage. The customer 12 is sent the signal 40 forming a screen icon that is a representation of the signal 40 on the display 30. The icon 40 on the phone 14 is flashing magenta walking two hump camel emoji in the same manner as the display 30 will be showing. The traditional information is also sent so, for example, the customer 12 knows to look for a black 2012 Lincoln MKS. This description is supplemented with the identification signal 40, although it is likely the signal 40 will be the dominant method that the customer 12 relies upon for vehicle identification.

The method according to the present invention comprises the step of displaying the visual identification signal 40, e.g., flashing magenta walking two hump camel emoji, on the display 30 at least at a time when the vehicle 32 is in close proximity to the customer 12, as discussed in further detail below. The system 10 may keep the display 30 off until the customer 12 and the vehicle 32 are within a given proximity using the GPS positioning of the smartphones 14 and 24. Alternatively, the system 10 may use direct activation from the customer's smartphone 14 to the display 30, like a Bluetooth connection or other coupling. The visual identification signal 40 will provide an immediately observable and recognizable indicator to the customer 12 to easily find and verify the vehicle 32. Further, if the application has a number of vehicles in the same location (e.g., the end of a given event) the application manager 20 can make sure that all of the identification signals 40 in a given location at a given time are unique.

Further the signals 40 may be selected by the customer 12, or the driver 22, for greater personalization and easy identification, however such customer selection is limited by the aspect is that the system 20 assures that the signals 40 are sufficiently unique. It is possible that a customer 12 or driver 24 may be told that the originally selected identification signal 40 is not sufficiently unique and a new signal 40 must be selected, or a unique signal 40 could simply be always supplied by the manager 20 of the system 10. Thus it is really the manager 20 that approves the specific signals 40, whether the manager receives proposed inputs from the customer 12 and/or the driver 22, in whole or in part.

The EVAS platform 10 may be configures such that the customer 12 selects only a portion of the signal 40, such as what a scrolling text is to say, e.g. "ROCK'S CHARIOT." The app/manager 20 essentially instantaneously approves the proposed text by making sure it is unique in a given area and is not otherwise objectionable, such as that it is not obscene, scandalous, libelous, illegal, or otherwise undesirable (like the trademark name of a competitor). In the rare chance that there is an objection found by the manager 20 with a proposed signal text, the EVAS platform 10 prompts the customer 12 for a new portion of the signal 40, maybe with some explanation (having the app message the customer 12 that "The proposed identifier is too similar to another customer in your area at this time" or that "Obscene, scandalous, libelous, unauthorized proprietary marks and/or other objectionable words/or phrases cannot be used."). With an approved text for the signal 40 the EVAS platform 10 can have the app/manager 20 select the color of the signal 40 based upon making sure the color, e.g., Green, is unique in the given area for this ride.

Another example of the EVAS platform 10 is where it is configured such that the customer 12 selects only a portion of the text of the signal 40. For example, where they only supply a customer ID or nickname and the remaining text is standard for the platform 10, such as a standard message "LYFT FOR {CUSTOMER NAME}" in scrolling text on the display 30. With a customer 12 who has an ID of PITTSBURGH ROCK this becomes "LYFT FOR PITTSBURGH ROCK". In this manner the customer 12 can have a default CUSTOMER NAME/ID that is used by the app in most cases, unless it is changed by the customer for a given trip in the app. If the customer desires to remain anonymous for a trip and not have his ID used, then the system can move to filling in the CUSTOMER NAME with "YOU BY {DRIVER ID}", with the drivers default ID filling this out, e.g. "LYFT FOR YOU BY JOHN'S RIDE." The platform 10 is simply quite flexible and easily adaptable to a number of customer/driver/service/regulatory needs and concerns.

Combinations of these signal creation configurations are also possible such as the customer 12 selecting a portion of the text of signal 40 and the driver selecting the proposed color of the signal 40 (or vice-versa), both of which are essentially approved by the manager 20 to comply with company/regulatory policies.

The method also provides for real time visual based taxi vehicle authentication for the drivers 22 as the driver 22 may request the customer 12 show the visual identification signal 40 on the customer's smartphone 14 to the driver 22 before allowing access to the vehicle 32.

Thus as an illustrative example of the present invention finding a black car of a given make and model at night in a line of cars at the end of a large stadium concert event can be daunting, but finding a vehicle 32 with a purple dancing unicorn 40 or a scrolling purple text UBER FOR FERRONE on a roof mounted display 30 becomes much easier (and possibly entertaining).

FIGS. 2A-D illustrate in more detail a preferred display 30 according to the present invention, which provides a portable, compact display that is effective over the relevant distance ranges. The display of FIGS. 2A-D is a disc shaped structure, typically 3"-8" in diameter, and 1½" to 6" in height having a programmable LED message display panel 33 around a substantial circumferential portion (at least 270 degrees) of the perimeter of the disc. An effective and cost efficient display panel 33 is formed with a panel having 7 rows of multicolor LED elements which is about 1½ to 2" in height and 8-12" in length extending about the circumference of the display 30. The higher the panel 33 the more rows of LED elements can be provided (of this type) increasing the versatility of what can be displayed (including more potential graphical displays with more rows). However, with the compact display 30 shown in FIG. 2, scrolling text (e.g. ROCK'S RIDE) can be efficiently and effectively used for identification signal 40, and forms the preferred visual identification signal. The scrolling text signal 40 can be in numerous colors with the LED element display panel 33. A 7 row programmable led display panel 33 provides a compact and highly cost effective display 30 with the versatility needed for the EVAS platform 10 of the present invention.

The front of the display 30 may have a portion 36 of 60-120 degrees, preferably 75-90 degrees without the display panel 33, in an effort to comply with all local vehicle ordinances. With scrolling text used for identification signal 40, the lack of display panel 33 at the front portion 36 is not detrimental as the customer 12 will typically be at an angle to the vehicle 32 on the side of the road in a location to see and read the signal 40. In other words the vehicle 32 will seldom be driving directly at the customer 12.

The circular perimeter of the display 30, particularly with scrolling text as signal 40, allows the panel 33 to have the signal properly orientated at the customer 12 in almost any location of the customer. A planar or polygon sided structure does not yield the same benefit. The display 30 of FIGS. 2A-D is typically 3"-8" in diameter, and preferably 3"-4.5" in diameter, and 1½" to 6", preferably 2-4" in height, to yield an efficient and compact display 30 that is easily stored by the driver 22.

The display 30 of the present invention of FIGS. 2A-D includes a temporary mount in the form of magnets 34, preferably rare earth magnets. The specific mounting may be changed to vacuum cups or other temporary mounts because the present EVAS platform 10 is designed with part time drivers 22 in mind.

The top 38 of the display 30 may have its own LED lighting elements mainly for matching the color of the signal 40, and not part of the scrolling text portion of the signal. Alternatively, the top 38 can serve as a place for a logo of the company, or for locating a solar panel 58 to assist in powering the display 30. Use of a solar panel 58 can help make the display 30 more energy efficient.

The display 30 of FIGS. 2A-D includes a speaker 52 that can be mounted in the portion 36 not having the panel 33. The provision of the speaker allows the EVAS platform 10 to be used by the visually impaired, even if the platform 10 and display 30 is largely visually based. The signal 40 can include audio components to be played through the speaker 52 together with on the display panel 33. Continuing with one of the above examples, where the customer 12 only supply a customer ID or nickname and the remaining text is standard for the platform 10, such as "LYFT FOR {CUSTOMER NAME}." With a customer 12 who has an ID of PITTSBURGH ROCK this becomes "LYFT FOR PITTSBURGH ROCK". In addition to "LYFT FOR PITTSBURGH ROCK" scrolling on the panel 33 when the car 32 is in close proximity to the customer 12 the speaker 52 could be also announcing "Lyft for Pittsburgh Rock." The audio portion of the signal 40 need not match the scrolling text portion and these portions of the signal 40 need not be used together. The app may have individual customer 12 preferences that indicates that the signal 40 for them preferably would be visual only, audio only or both. Further like a default customer ID for text, the audio portion of a signal 40 may have a default for each customer 12 which can be individual to the customer 12 like a unique ringtone for their phone 14. Further the audio portion of signal 40, if used, could be a recording from the customer 12 and thus be in the voice of the customer 12, or someone designated by the customer 12, which could further assist in the customer identifying the vehicle 32, as the audio portion of the signal 40 is in a customer recognized voice.

The display 30 of FIGS. 2A-D includes a controller 54 coupled via connection 28 (Bluetooth or the like) to the phone 24 of the driver 22, and via the phone 24 to the manager 20. The controller 54 controls the panel 33 and the speaker 52 for conveying the signal 40 and other needed displays. For example, when not in use as the display 30 of the EVAS platform 10 in the manner described herein, the display 30 may be controlled by the driver 22 via his phone 24 to display desired messaging on display 33 and/or speaker 52. This gives the driver 22 a fully functional remote speaker and messaging system formed by display 30 for his benefit in off hours. For example, where the driver is also a delivery person, the display 30 may yield utility in such an off hour job such as announcing "XOXO pizza delivery." It may simply be used as a Bluetooth speaker for listening to music with added cool scrolling messages solely for amusement. The uses of the display 30 by the driver 22 in such down time/off hours is limitless, but can be sufficiently advantageous to permit the operators of the smartphone application based taxi services to have the drivers 22 pay to offset some or all of the cost of the display 30.

The display 30 of FIGS. 2A-D includes a battery 56 for powering the panel 33, speaker 52 and controller 54. The battery 56 can be charged by solar panel 58, if provided, and further is preferably rechargeable via suitable connection, such as a phone charger in the vehicle 32.

FIG. 3 is a schematic illustration showing proximity ranges for staged output of the preferred EVAS display 30 of FIGS. 2A-D for use in the EVAS platform 10 according to the present invention. As noted above within close proximity 62 (such as less than 100 feet or 50 feet or 30 feet) between the customer 12 and the vehicle 32, as measured by the GPS positioning of the phones 14 and 24, the scrolling text of signal 40 will display in the unique color, together with whatever audio portions of the signal 40 (alternatively the audio portions of the signal 40 if any could be triggered by a separate close proximity 62 less than (such as 30 feet) the one used to trigger the remaining portions of the signal 40). The preferred EVAS display 30 of FIGS. 2A-D can also light up in a color, namely the same color as the signal 40, when the vehicle 32 is within a greater visual distance 64 (such as less than 500 feet); whereby between the visual distance 64 and the close proximity 62 the display 30 has all of the panel 33 illuminated in the color of the signal 40 (but no text), then switches over to the unique signal 40 within the close proximity 62. Outside of the visual distance 64 no visual or audio display of any kind is needed (except for security check points as noted below). This staged operation will provide advantageous operation to the EVAS platform 10. With all the LED elements illuminated between ranges 62 and 64, the display 30 (and associated vehicle 32) can be seen by most customers 12 at a greater distance than if the signal 40 is displayed, and certainly at a greater distance than the particulars of the signal 40 can be distinguished. Further, consider an example that if a customer 12 is at an airport and see two similar lights 30 on two approaching vehicles 32 (but the manager 20 should minimize this issue as noted above, but the perceived similarity may only be by the customer 12), as one proper vehicle 32 moves within a known close proximity distance 62 distance the customer 12 will see the display 30 switch to the identification signal 40 whereby the customer 12 will have a strong indication that this is in fact his vehicle 32 even before he can read and verify the signal 40 (and alternatively he will have a strong indication that it is not his vehicle 32 if the vehicle 32 gets close and the display 30 does not change to the identification signal 40). The staged operation shown in FIG. 3 is believed to yield some intuitive customer advantages to the EVAS platform 10.

There are some applications that the EVAS platform 10 of the present invention is particularly well suited to address. One is restricted access areas having human guards permitting or restricting access, such as a gated residential community or a secured work, military or academic campus. The EVAS platform 10 allows the customers 12 to communicate with the security checkpoint and allows the platform 10 to utilize the security checkpoint smartphones (not shown) to actuate the signal 40 on the display 30 of the vehicle 32 in a manner the same as the customer 12. Thus as the vehicle is approaching the checkpoint the vehicle 32 will display the signal 40 which can be verified by the security checkpoint personal on their smartphones. In many such applications, like a gated community or college campus this visual check may be sufficient. In a more secure environment, this may visual check/identification may then prompt a more detailed interaction with the security personnel and the vehicle 32/driver 22, but the system 10 allows the relevant more detailed information to be easily transmitted from the customer 12 and/or manager 20 to the security checkpoint and the security personnel will have it on their phones as they check the vehicle 32 and/or the driver 22 using desired protocols.

Another application that the EVAS platform 10 of the present invention is particularly well suited to address is caregiver transportation of third parties without the caregiver necessarily present. Several example can be i) shared custody of minors between divorced parents, in which the minor children can be sent via a vehicle 32 without the custodial parent going on the trip; ii) sending a ride for a minor when the custodial parents are not home (e.g., child misses school bus after parents left for work, transportation to/from a practice or event before parent gets home from work); sending a ride for an elderly parent/grandparent who may not be completely comfortable with operating an app for a smartphone application based taxi service. In these circumstances the custodial customer 12 ordering the service may be different from the passenger customer 12. In this context, EVAS platform 10 allows the custodial customer 12 to communicate with the passenger customer 12 and allows app to utilize the passenger smartphones 14 to actuate the signal 40 on the display 30 of the vehicle 32 in a manner the same as described above. The custodial or caregiver customer 12 (non-passenger) would be instructing their charges (passenger customers) to look for the signal 40 (e.g. "Lyft for Grandmother Jones" in Purple) on the vehicle 32 that can greatly alleviate the passenger customer 12 concerns with using the service. For minor children, the speaker 52 could be used to further personalize the signal 40 with, for example, the signal 40 may include the message in the caregiver (Mom's) own voice "Uber for Jimmie for Basketball Practice." Caregiver control with the EVAS platform 10 of the present invention can be particularly helpful for select situations.

It is apparent that many variations to the present invention may be made without departing from the spirit and scope of the invention. The present invention is defined by the appended claims and equivalents thereto.

What is claimed is:

1. A method for real time visual based taxi vehicle authentication for customers and drivers for smartphone application based taxi services comprising the steps of:
   Providing a visible taxi display unit on a taxi vehicle in a conspicuously visible location that is coupled to the taxi vehicle driver's smartphone, wherein the visible taxi display unit is configured for real time selective displaying changeable unique visual identification signals which comprise at least one of i) a range of selectable alphanumeric information, ii) a range of selectable pictographic images, iii) visual effects/animations, iv) audio-visual components and v) combinations thereof, wherein the taxi display unit is a portable, compact display formed as a disc shaped structure 3"-8" in diameter and 1-½" to 6" in height having a programmable LED message display panel around a circumferential portion of the perimeter of the disc;
   Selecting a specific visual identification signal by the smartphone application for a given customer, driver and vehicle for a specific use and sending this visual identification signal to the customer and to the driver via the smartphone application, wherein the visual identification signal is selectively viewable by the customer and displayed on the customer's smartphone;
   Displaying the visual identification signal on the taxi display unit at least at a time when the vehicle is in proximity to the customer, wherein the unique visual identification signals comprise at least scrolling text on the taxi display unit.

2. The method for real time visual based taxi vehicle authentication for customers and drivers according to claim 1 further including the step of the customer showing the visual identification signal on the customer's smartphone to the driver.

3. The method for real time visual based taxi vehicle authentication for customers and drivers according to claim 1 wherein the step of displaying the visual identification signal on the taxi display unit is only at a time when the vehicle is in proximity to the customer.

4. The method for real time visual based taxi vehicle authentication for customers and drivers according to claim 1 wherein the unique visual identification signals comprising at least a range of colors.

5. The method for real time visual based taxi vehicle authentication for customers and drivers according to claim 1 wherein the unique visual identification signals comprise audio-visual components.

6. The method for real time visual based taxi vehicle authentication for customers and drivers according to claim 1 wherein the front of the taxi display unit has a 60-120 degree portion without the programmable LED message display panel.

7. The method for real time visual based taxi vehicle authentication for customers and drivers according to claim 1 wherein the taxi display unit includes a temporary mount in the form of at least one magnet.

8. The method for real time visual based taxi vehicle authentication for customers and drivers according to claim 1 wherein the taxi display unit includes a solar panel to assist in powering the display.

9. The method for real time visual based taxi vehicle authentication for customers and drivers according to claim 1 further configured for caregiver transportation of third parties, including the steps of ordering the taxi by a custodial customer and communicating via the smartphone application with a passenger customer, wherein the visual identification signal is selectively viewable by the passenger customer and displayed on the passenger customer's smartphone.

10. The method for real time visual based taxi vehicle authentication for customers and drivers according to claim 1 wherein within a close proximity between the customer and the taxi vehicle the scrolling text forming part of the visual identification signal is displayed on the taxi display unit in the unique color, and between a visual distance and the close proximity the display panel of the taxi display unit is illuminated in the unique color of the visual identification signal.

11. The method for real time visual based taxi vehicle authentication for customers and drivers according to claim 1 wherein the method includes restricted area access accommodation wherein the customers communicates with a security checkpoint and allows the security checkpoint smartphones to actuate the visual identification signal on the taxi display unit of the taxi vehicle in proximity to the checkpoint.

12. An apparatus for real time visual based taxi vehicle authentication for customers and drivers for smartphone application based taxi services comprising a visible taxi display unit configured to be placed on a taxi vehicle in a conspicuously visible location, wherein the taxi display unit is coupled to the taxi vehicle driver's smartphone, and wherein the visible taxi display unit is configured for real time selective displaying changeable unique visual identification signals comprising at least one of i) a range of selectable alphanumeric information, ii) a range of selectable pictographic images, iii) audio components, iv) visual effects/animations and v) combinations thereof, wherein the unique visual identification signals comprise at least scrolling text on the taxi display unit, and wherein the apparatus is configured for selecting of a specific visual identification signal by the smartphone application for a given customer, driver and vehicle for a specific use and sending this visual identification signal to the customer and to the driver via the smartphone application, wherein the visual identification signal is selectively viewable by the customer and displayed on the customer's smartphone, and wherein the apparatus is configured for displaying the visual identification signal on the taxi display unit at least at a time when the vehicle is in proximity to the customer, and wherein the display is a portable, compact display formed as a disc shaped structure 3"-8" in diameter and 1-½" to 6" in height having a programmable LED message display panel around a circumferential portion of the perimeter of the disc.

13. The apparatus for real time visual based taxi vehicle authentication for customers and drivers according to claim 12 wherein the taxi display unit includes a speaker.

14. The apparatus for real time visual based taxi vehicle authentication for customers and drivers according to claim 12 wherein the front of the taxi display unit has a 60-120 degree portion without the display panel.

15. The apparatus for real time visual based taxi vehicle authentication for customers and drivers according to claim 12 wherein the taxi display unit includes a temporary mount in the form of at least one magnet.

16. The apparatus for real time visual based taxi vehicle authentication for customers and drivers according to claim 12 wherein the taxi display unit includes a solar panel to assist in powering the display.

* * * * *